(12) United States Patent
Siebenmorgen et al.

(10) Patent No.: US 11,163,147 B2
(45) Date of Patent: *Nov. 2, 2021

(54) ARRANGEMENT FOR MICROSCOPY AND FOR CORRECTION OF ABERRATIONS

(71) Applicant: Carl Zeiss Microscopy GmbH, Jena (DE)

(72) Inventors: Jörg Siebenmorgen, Jena (DE); Helmut Lippert, Jena (DE); Thomas Kalkbrenner, Jena (DE); Ingo Kleppe, Jena (DE); Ralf Wolleschensky, Jena (DE); Artur Degen, Jena (DE); Matthias Wald, Jena (DE); Lars-Christian Wittig, Jena (DE); Michael Gölles, Jena (DE); Wolfgang Singer, Aalen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 54 days.

This patent is subject to a terminal disclaimer.

(21) Appl. No.: 16/313,645

(22) PCT Filed: Jun. 29, 2017

(86) PCT No.: PCT/EP2017/066136
§ 371 (c)(1),
(2) Date: Dec. 27, 2018

(87) PCT Pub. No.: WO2018/002225
PCT Pub. Date: Jan. 4, 2018

(65) Prior Publication Data
US 2019/0170995 A1    Jun. 6, 2019

(30) Foreign Application Priority Data
Jul. 1, 2016 (DE) .......................... 102016212020.4

(51) Int. Cl.
*G02B 21/06* (2006.01)
*G02B 27/14* (2006.01)
(Continued)

(52) U.S. Cl.
CPC ....... *G02B 21/361* (2013.01); *G02B 21/0032* (2013.01); *G02B 21/0076* (2013.01);
(Continued)

(58) Field of Classification Search
CPC ....................... G02B 21/0032; G02B 21/0076; G02B 21/02; G02B 21/04; G02B 21/06;
(Continued)

(56) References Cited

U.S. PATENT DOCUMENTS 3,305,294 A    2/1967 Alvarez
2016/0291304 A1*  10/2016 Singer .................... G02B 13/18
(Continued)

FOREIGN PATENT DOCUMENTS

DE    102010039746 A1   3/2012
DE    102013107297 A1   1/2015
(Continued)

OTHER PUBLICATIONS

McGorty, et al; "Open-top selective plane illumination microscope for conventionally mounted specimens"; Optics Express 2015; 23(12):16142-16153.
(Continued)

*Primary Examiner* — Thong Q Nguyen
(74) *Attorney, Agent, or Firm* — Duane Morris LLP

(57) ABSTRACT

An arrangement for microscopy, having an illumination optical unit with an illumination objective for illuminating a specimen on a specimen carrier. An optical axis of the illumination objective lies in a plane which includes an illumination angle that differs from zero with the normal of a specimen plane and the illumination is implemented in the (Continued)

Figure 1:
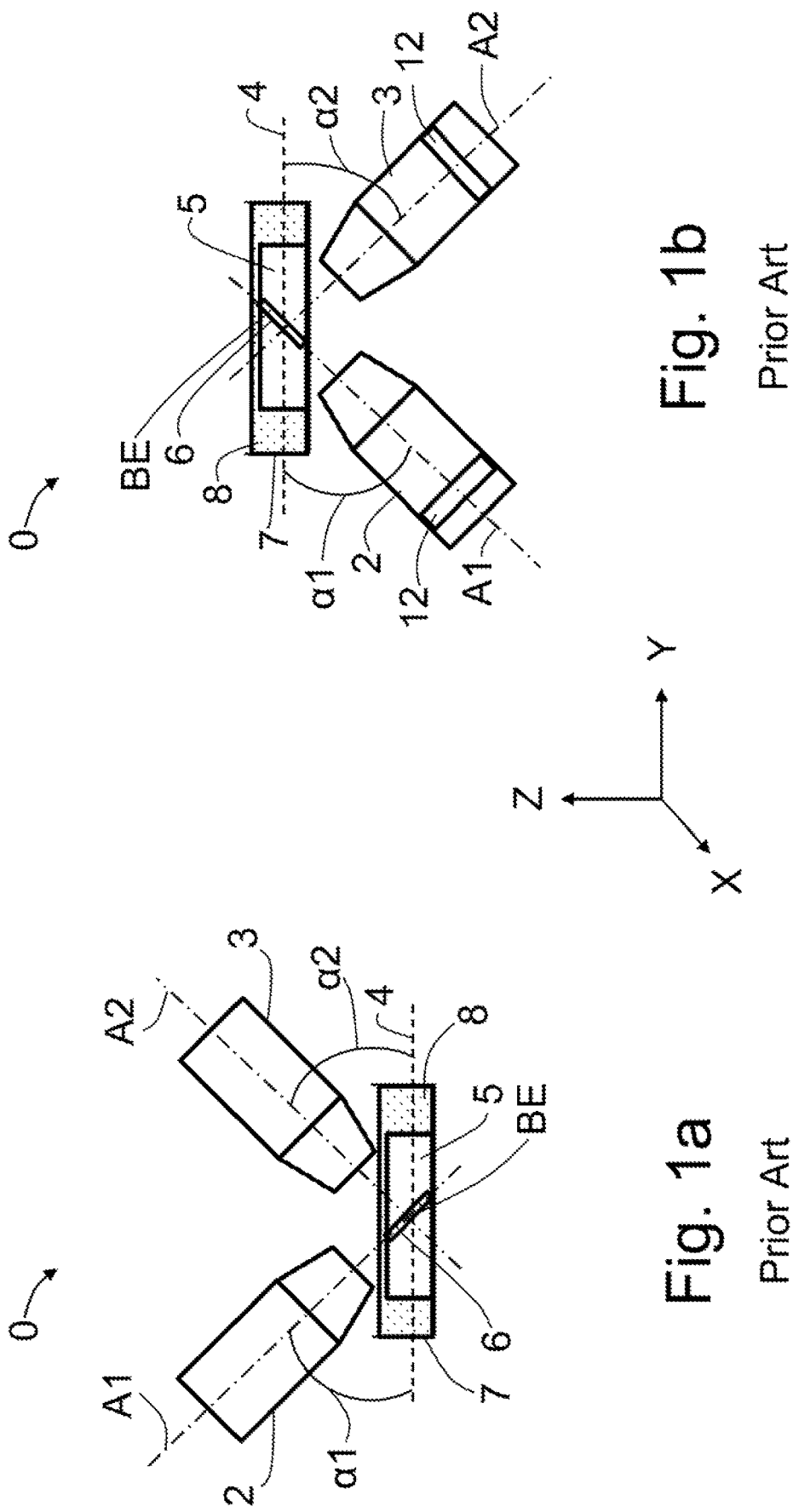

plane. A detection optical unit with a detection objective is located in a detection beam path. The optical axis of the detection objective includes a detection angle that differs from zero with the normal of the specimen plane. The illumination objective and/or the detection objective has an illumination correction element. A meniscus lens is located between the specimen carrier and the illumination and detection objectives being arranged both in the illumination beam path and in the detection beam path.

9 Claims, 6 Drawing Sheets

(51) Int. Cl.
  *G02B 21/36*  (2006.01)
  *G02B 21/00*  (2006.01)
  *G02B 21/16*  (2006.01)
  *G02B 21/02*  (2006.01)
  *G02B 21/04*  (2006.01)

(52) U.S. Cl.
  CPC ............. *G02B 21/02* (2013.01); *G02B 21/04* (2013.01); *G02B 21/06* (2013.01); *G02B 21/16* (2013.01)

(58) Field of Classification Search
  CPC .. G02B 21/16; G02B 21/361; G02B 27/0025; G02B 27/4211; G02B 27/4216

USPC ......................... 359/368, 369, 372, 385, 637
  See application file for complete search history.

(56) References Cited

U.S. PATENT DOCUMENTS

| | | | | |
|---|---|---|---|---|
| 2016/0349495 A1* | 12/2016 | Pretorius | ................ | G02B 13/18 |
| 2017/0293130 A1* | 10/2017 | Huang | ............... | G02B 21/0088 |
| 2019/0265454 A1* | 8/2019 | Kalkbrenner | .......... | G02B 21/32 |
| 2020/0012084 A1* | 1/2020 | Siebenmorgen | ... | G02B 21/0076 |
| 2020/0271912 A1* | 8/2020 | Pergande | ........... | G02B 21/0088 |

FOREIGN PATENT DOCUMENTS

| | | |
|---|---|---|
| DE | 102013112595 A1 | 5/2015 |
| DE | 102013112600 A1 | 5/2015 |
| DE | 102014104977 A1 | 10/2015 |
| JP | 2000058436 A | 2/2000 |
| WO | 2015071362 A1 | 5/2015 |
| WO | 2015071363 A1 | 5/2015 |
| WO | 2016054474 A1 | 4/2016 |

OTHER PUBLICATIONS

International Search Report dated Oct. 9, 2017.
Notification of Transmittal of Translation of the International Preliminary Report on Patentability, International Preliminary Report on Patentability, and Written Opinion of the International Searching Authority dated Jan. 10, 2019.

* cited by examiner

ARRANGEMENT FOR MICROSCOPY AND FOR CORRECTION OF ABERRATIONS

RELATED APPLICATIONS

The present application is a U.S. National Stage application of International PCT Application No. PCT/EP2017/066136 filed on Jun. 29, 2017 which claims priority benefit of German Application No. DE 10 2016 212 020.4 filed on Jul. 1, 2016, the contents of each are incorporated by reference in their entirety.

FIELD OF THE INVENTION

The invention relates to an arrangement for microscopy.

BACKGROUND OF THE INVENTION

One of the main applications of light sheet microscopy lies in imaging midsized specimens, for example organisms, with dimensions of several 100 μm up to a few millimeters. As a rule, these specimens are embedded in agarose and arranged in a glass capillary. For the purposes of examining the specimen, the glass capillary is introduced into a water-filled specimen chamber. The agarose with the specimen is pushed slightly out of the capillary and illuminated by a light sheet. The fluorescence that is excited in the specimen and that emanates from the latter is imaged onto a detector, in particular a camera, by means of a detection objective, which is perpendicular to the light sheet and consequently also perpendicular to the light sheet optical unit (which unit includes an illumination optical unit and an illumination objective).

In accordance with the prior art, a layout of a microscope 0 for light sheet microscopy (SPIM layout; single plane illumination microscopy) comprises an illumination objective 2 with a first optical axis A1 and a detection objective 3 with a second optical axis A2 (also referred to as SPIM objectives) which are each directed onto a specimen plane 4 from above at an angle $\alpha 1$ or $\alpha 2$ of 45° in relation to the specimen plane 4 and at right angles in relation to one another (see FIG. 1a) A specimen 5 arranged in a specimen region provided therefor in the specimen plane 4, which is also used as a reference plane, is situated, for example, on the base of a specimen holder 7 that is embodied as a Petri dish. The specimen holder 7 is filled with a medium 8, e.g., water, and the two SPIM objectives 2, 3 are immersed in the medium 8 during the application of the light sheet microscopy (not shown). The specimen plane 4 extends in a plane XY spanned by the X-axis X and the Y-axis Y of a Cartesian coordinate system. The first optical axis A1 and the second optical axis A2 extend in a plane YZ spanned by the Y-axis Y and the Z-axis Z of the Cartesian coordinate system.

FIG. 1b schematically shows a microscope 0 with an inverted arrangement of illumination objective 2 and detection objective 3 according to the prior art, in which the illumination objective 2 and the detection objective 3 are arranged below the specimen plane 4. Once again, the angles $\alpha 1$ and $\alpha 2$ are 45° in each case.

This approach offers the advantage of a high resolution in the axial direction since a thin light sheet 6 (see also FIG. 1a) may be produced by means of the illumination objective 2. Smaller specimens 5 may be examined on account of the higher resolution. Additionally, the bothersome background fluorescence is significantly reduced and the signal-to-noise ratio is improved as a result thereof.

In order to facilitate simpler specimen preparation in standard specimen containers such as e.g. multiwell plates, it is possible to maintain the 45° configuration but have the two SHIM objectives 2, 3, in an inverse arrangement, be directed into the specimen plane 4 from below through the transparent base of the specimen holder 7 (FIG. 1b). In this arrangement, it is necessary to correct the aberrations caused by the specimen holder 7 which is inclined relative to the optical axes A1 and A2 and present in the form of a cover slip by using special optical elements. The specimen 5 arranged in the specimen plane 4 is illuminated through the base of the specimen holder 7 and excited fluorescence of the specimen 5 is detected. It is possible to use specimen holders 7 such as e.g. multiwell plates, Petri dishes and/or object supports and contamination of the specimens 5, in particular in the case of high-throughput screening, may be avoided.

Further technical difficulties arise if, for example, Alvarez plates of an Alvarez manipulator 12 (FIG. 1B; the Alvarez plates are noted in simplified fashion) are arranged in the beam path of the illumination objective 2 and/or detection objective 3, as is known, for example, from U.S. Pat. No. 3,305,294 A. The Alvarez plates are embodied in such a way that they correct aberrations that occur, precisely in the case of a set angle between the specimen holder 7, e.g., a cover slip, and the optical axes A1, A2 of the respective objective 2, 3. Unwanted aberrations that lead to a lower imaging quality already occur in the case of a small deviation of the angle (e.g., <0.1°). Therefore, the cover slip, for example, must be aligned before the start of an experiment so that the angle deviation lies within the admissible tolerances. Moreover, it is helpful if the distance between the objective 2, 3, or a possibly present additional lens, and the cover slip is also adjustable in addition to the angle such that the specimen 5, or the region thereof to be imaged, lies in the image plane BE of the detection objective 3.

DE 10 2013 112 600 A1 has disclosed a virtual relay, which serves to correct errors that arise in the case of an oblique passage of the rays through an object carrier. Since the virtual relay has a high numerical aperture >1.2, pronounced imaging aberrations may occur as a result of small deviations, which may vary from experiment to experiment, within the optical system. These deviations may be based on, inter alia, the variance of the cover slip thickness, changes in temperature, refractive index differences, tilts of the cover slip or wedge errors of the cover slip.

There are a number of options for correcting these aberrations. Thus, DE 10 2013 112 595 A1 and DE 10 2014 104 977 A1 have described the arrangement of an Alvarez manipulator within the detection objective. To this end, use is made of a free-form correction lens, which either is arranged between the specimen and the detection objective or represents the front lens of the objective. There is a description of microscope objectives which correct the aberrations of the oblique passage of the illumination and detection radiation through a cover slip.

According to DE 10 2013 107 297 A1, sliding lenses for correcting aberrations can be provided in an objective. A further option, likewise described in DE 10 2013 170 297 A1, consists in arranging adaptive mirrors or spatial light modulators (SLMs) in the frequency space (e.g., in a pupil) outside of the objective.

A further possibility for correcting aberrations of a microscope caused by a cover slip is known from the publication by McGorty et al. (2015: Open-top selective plane illumination microscope for conventionally mounted specimens; OPTICS EXPRESS 23: 16142-16153). The inverted SPIM microscope has a water prism, by the effect of which aberrations occurring as a consequence of the oblique passage of the detection light through the cover slip are partly compensated.

SUMMARY OF THE INVENTION

The invention is based on the object of proposing options, improved over the prior art, for correcting aberrations arising, in particular, on account of oblique passages of illumination radiation and detection radiation through optically refractive layers. In particular, the intention is to propose improved arrangements for microscopy and, in particular in this case, arrangements for light sheet microscopy in turn.

This objective is generally achieved by means of an inventive arrangement for microscopy as described herein. Specifically, the microscopy arrangement has an illumination optical unit with an illumination objective for illuminating a specimen. The optical axis of the illumination objective lies in a plane which includes an angle (illumination angle) that differs from zero with the normal of a reference plane. The illumination by means of the illumination objective is implemented in the aforementioned plane. A detection optical unit, having a detection objective, is located in a detection beam path. A correction element that is arranged in the beam path has an illumination correction element can be arrange in the beam path. Further, a meniscus lens, between the specimen carrier and the two objectives, is arranged both in the illumination beam path and in the detection beam path. The meniscus lens is embodied to correct aberrations that arise on account of the passage through media with different refractive indices of radiation to be detected.

BRIEF DESCRIPTIONS OF THE DRAWINGS

Figure 2:
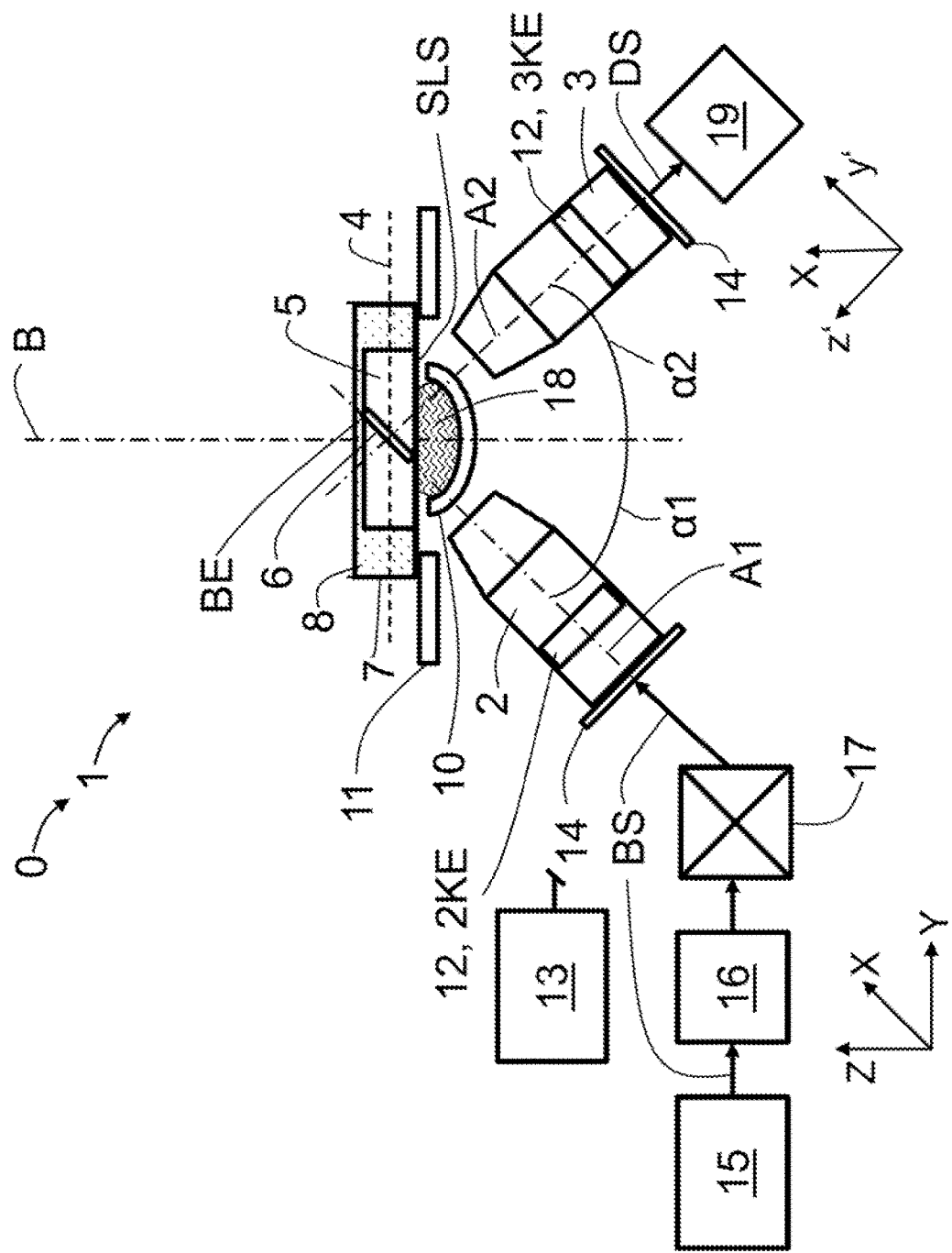
Figure 3:
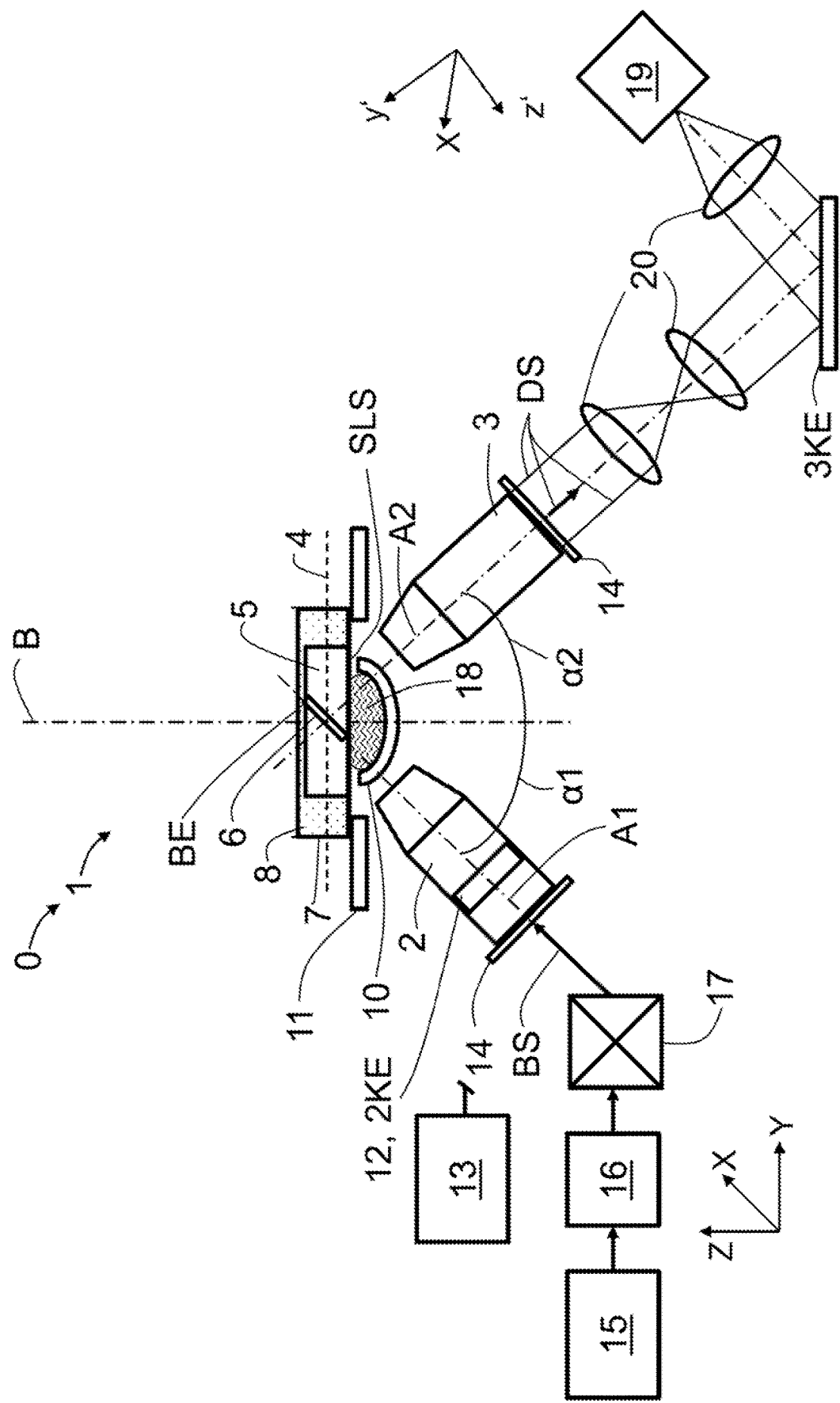
Figure 4:
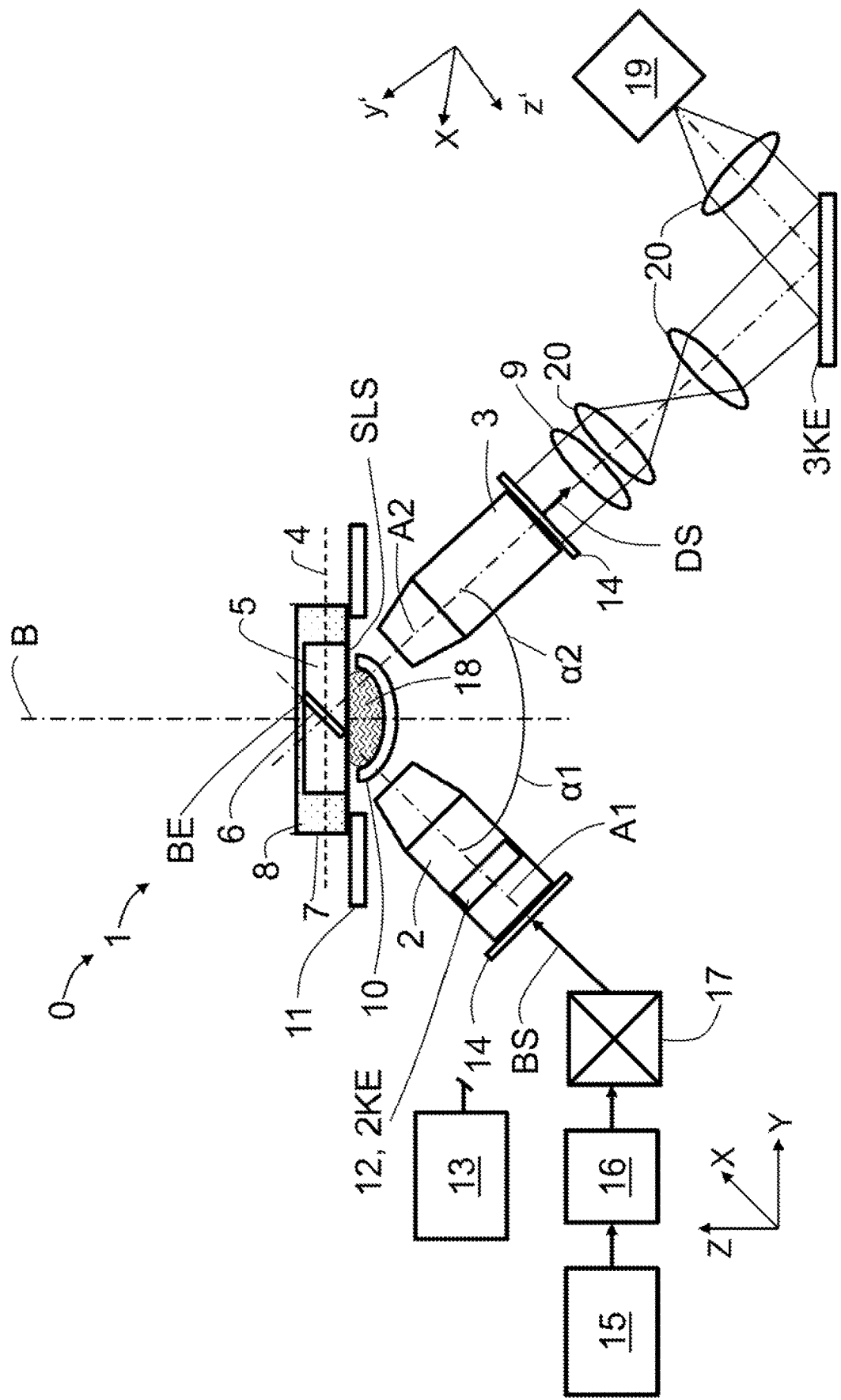
Figure 5:
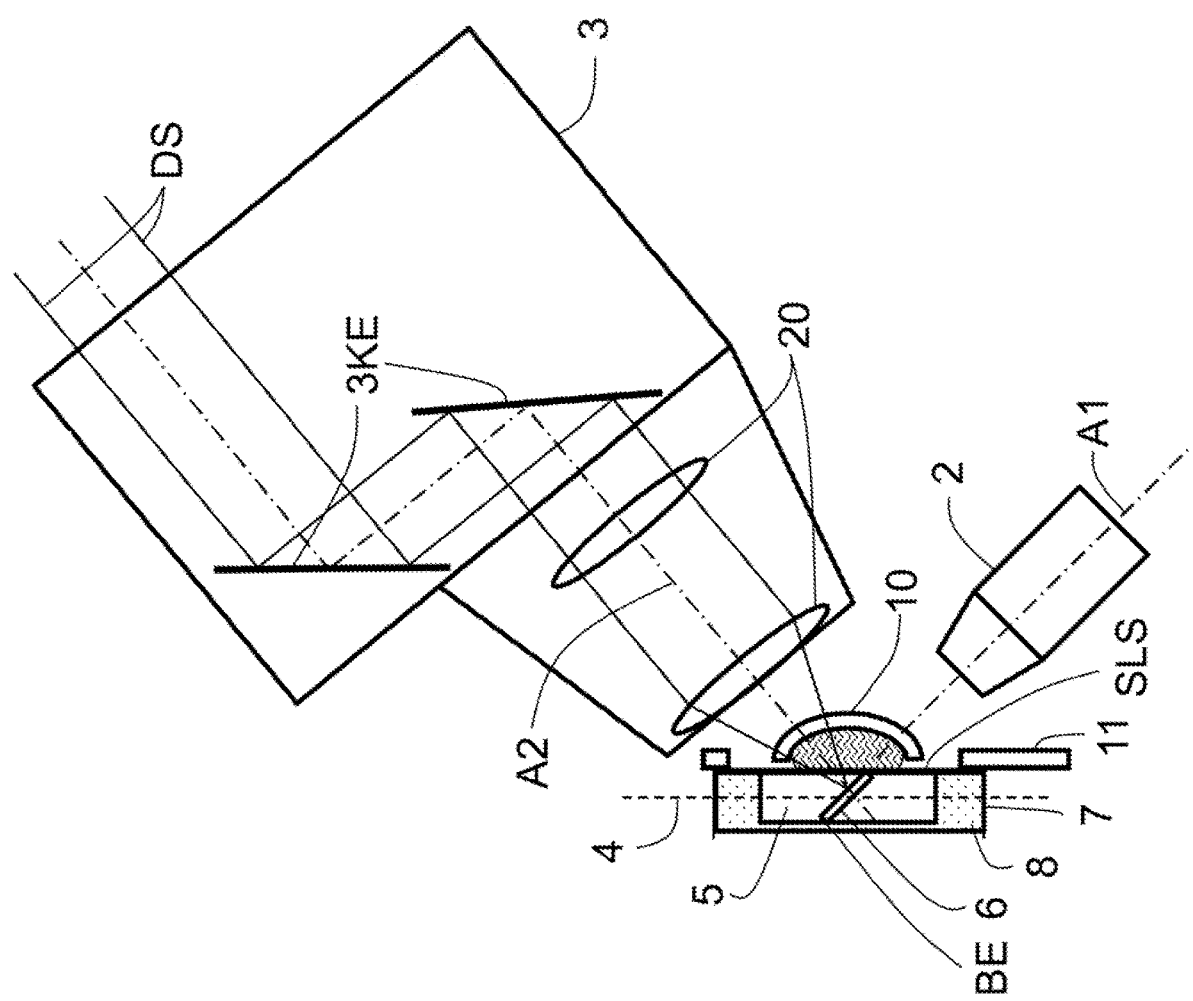
Figure 6:
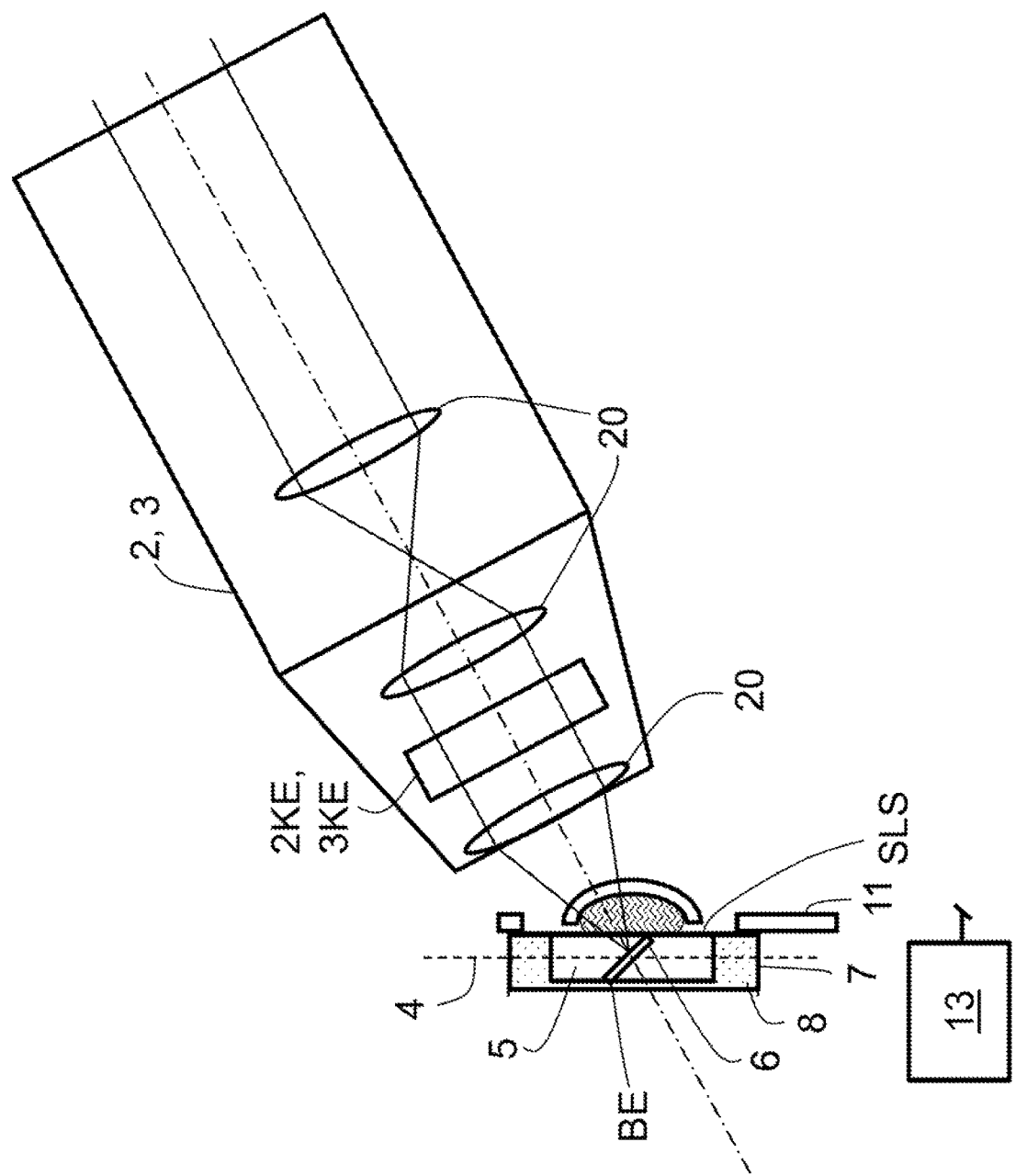

The invention is explained in more detail below on the basis of exemplary embodiments and figures. In the figures:

FIG. 1a is a schematic illustration of an arrangement of a light sheet microscope according to the prior art, FIG. 1b is a schematic illustration of an inverted arrangement of a light sheet microscope according to the prior art, FIG. 2 is a schematic illustration of a first exemplary embodiment of an arrangement of a light sheet microscope according to the invention, FIG. 3 is a schematic illustration of a second exemplary embodiment of an arrangement of a light sheet microscope according to the invention, FIG. 4 is a schematic illustration of a third exemplary embodiment of an arrangement of a light sheet microscope according to the invention, FIG. 5 is a schematic illustration of a fourth exemplary embodiment of an arrangement of a light sheet microscope according to the invention and FIG. 6 is a schematic illustration of an exemplary embodiment of an objective for use in one of the arrangements according to the invention of a microscope.

DETAILED DESCRIPTION OF THE EMBODIMENTS

Specifically, the microscopy arrangement has an illumination optical unit with an illumination objective for illuminating a specimen situated on a specimen carrier in a specimen region via an illumination beam path, wherein the optical axis of the illumination objective lies in a plane which includes an angle (illumination angle) that differs from zero with the normal of a reference plane, in respect of which the specimen carrier is aligned. The illumination by means of the illumination objective is implemented in the aforementioned plane. Furthermore, a detection optical unit is present, having a detection objective in a detection beam path. The optical axis of the detection objective includes an angle (detection angle) that differs from zero with the normal of the reference plane. The detection objective comprises a detection correction element that is arranged in the beam path or introducible into the latter and/or the illumination objective comprises an illumination correction element that is arranged in the beam path or introducible into the latter.

According to the invention, a meniscus lens is present between the specimen carrier and the two objectives, said meniscus lens being arranged both in the illumination beam path and in the detection beam path. The meniscus lens is embodied to correct aberrations that arise on account of the passage through media with different refractive indices of radiation to be detected, in particular light, and/or radiation for illuminating the specimen. The correction element or correction elements is or are embodied to correct remaining aberrations.

In the specimen plane, which is also referred to as reference plane, the specimen is arranged in a region, the specimen region, provided therefor or it can be arranged there.

The illumination can be implemented in punctiform, linear, ring-shaped or planar fashion or over an illumination area with a freely selectable form. For the purposes of simplifying the description, reference is also made below to a correction element or correction elements if the description relates to both an illumination correction element and a detection correction element, or to both.

Remaining aberrations can be those (residual) imaging aberrations that result from an incomplete correction of the aberrations on account of the oblique passage of the radiations, whether these be illumination radiation and/or detection radiation. Further, remaining aberrations are errors that occur, for example, on account of a variance in the coverslip thickness, temperature changes, differences in the refractive index of layers through which radiation passes, tilts of the cover slip or wedge errors of the cover slip. These remaining aberrations are corrected or at least reduced. By way of example, a cover slip should be equated to the base of a specimen vessel or an object carrier made of a different material than glass.

The arrangement can have a separation layer system with at least one layer made out of a predetermined material with a predetermined thickness. The at least one layer, for example a cover slip, separates a medium, in which the specimen is situated, from the illumination objective and the detection objective. By means of a base that is aligned parallel to the reference plane, the separation layer system is in contact with the medium and/or with an immersion medium, at least in the region that is accessible to the illumination objective and the detection objective for the purposes of illumination and detection, respectively. The medium and the immersion medium are separated from one another by way of the separation layer system.

The aberrations and the remaining aberrations are reducible for a predetermined range of illumination angles or detection angles and/or for a predetermined range of the thickness of the at least one layer of the separation layer system.

A meniscus lens is a lens which has two lens faces that are curved to the same side. Advantageously, both lens surfaces have the same center point. The two lens surfaces of the meniscus lens can be situated in different media, for example immersion media and/or air, with a different refractive index in each case. Compared to the virtual relay known from the prior art and compared to the free-form correction lenses, which are likewise already known in advance, the meniscus lens is advantageous in that it is producible in a simpler and more cost-effective manner since there is no need for the complicated production of free-form surfaces.

The meniscus lens can be held in stationary fashion. Focusing is implemented by displacing the specimen with the specimen carrier or by displacing the objectives along the optical axis thereof.

Using the meniscus lens, errors that arise during the transition of the illumination radiation and/or detection radiation between two media or layers with different refractive indices are corrected or correctable. By contrast, aberrations on account of the oblique passage are not corrected. These remaining aberrations can be corrected outside and/or within the objective by means of the illumination correction element and/or by means of the detection correction element (correction elements).

In order to realize an arrangement for light sheet microscopy, a radiation used for illumination purposes is formed into a light sheet and directed into the specimen region. In alternative embodiments, the light sheet is produced in the specimen region by means of the illumination radiation by virtue of, for example, a beam of the illumination radiation being moved in the plane (dynamic light sheet). Here, the optical axis of the illumination objective and the light sheet lie in a plane which includes an illumination angle that differs from zero with the normal of the reference plane.

In one embodiment of the arrangement, the optical correction element is arranged in a pupil of the detection objective and/or of the illumination objective. For simplification purposes, the illumination objective and detection objective are also referred to as objectives.

An arrangement of the optical correction element in a pupil, or as close as possible to the pupil, advantageously avoids unwanted field-dependent effects. In the pupil, the correction element has the same effect on all field points. As the distance between the pupil and the respective optical correction element increases, the more field dependencies come into effect, and so the unwanted field-dependent effects are pronounced more strongly with increasing distance.

In a possible embodiment of the arrangement according to the invention, the optical correction element is arranged close to the pupil if the latter is situated within the depth of field of, for example, the tube lens of the detection objective or of the illumination objective.

Both the optical illumination correction element and the optical detection correction element can be embodied as static correction elements or as adaptive correction elements.

By way of example, static correction elements are at least one phase plate or a free-form lens. The free-form lens need not necessarily be placed in the pupil and can be the front lens, for example, of the respective objective. A static correction element such as the phase plate brings about a correction of static components of the aberrations.

In order to compensate linked residual aberrations of the setup and specimen-induced aberrations, it is possible to house adaptive correction elements in the illumination and detection beam path of the arrangement. Dynamic or variable components of the aberrations can be corrected by means of at least one adaptive correction element, wherein the adaptive correction element is or are arranged within or outside of the objective or the objectives. In respect of its corrective power, an adaptive correction element has an adjustable and adaptive embodiment. Consequently, dynamic corrections of the aberrations, in particular of the remaining aberrations, are advantageously facilitated.

Static and adaptive correction elements can be combined in an arrangement according to the invention. Thus, the static correction element is a phase plate for correcting static aberrations and an adaptive correction element is arranged in the illumination beam path and/or in the detection beam path in one possible embodiment of the arrangement.

If an adaptive correction element is assigned to each objective or if each of the objectives has an adaptive correction element, one of the adaptive correction elements can be present within the respective objective and the other adaptive correction element can be present outside of the respective objective.

Expediently, an adaptive correction element is arranged in a pupil plane of the arrangement in such a way that the effective aperture of the adaptive correction element and the size of the changeable adaptive correction element or of the changeable adaptive correction elements fit well to the size of the pupil in the pupil planes and it is possible to set desired wavefront deformations for the aberrations to be compensated and/or supply a necessary phase deviation for the aberrations to be compensated. By way of example, this adaptation and the accessibility of the adaptive correction element are obtained by a pupil relay optical unit, which images the objective pupil of the illumination or detection objective onto the adaptive correction element. Sufficiently small adaptive correction elements can also be arranged directly in, or immediately downstream of, the objective.

By way of example, adaptive mirrors or at least one spatial light modulator (SLM) are adaptive correction elements. The SLM can be embodied as a reflective SLM or as a transmissive SLM.

In further embodiments, the adaptive correction element is an Alvarez manipulator, at least one adaptive mirror, at least one tilt lens, at least one sliding lens, at least one deformable optical lens or a combination thereof.

In a further embodiment of the arrangement, the adaptive correction element is a spatial light modulator while a cylindrical lens for the partial compensation of occurring aberrations is present in the beam path of one of the objectives, in particular in the detection beam path.

Further, it is possible for the adaptive correction element to be an adaptive mirror and for a cylindrical lens for the partial compensation of concurrent astigmatism to be present in the beam path of one of the objectives, in particular in the detection beam path.

In an embodiment with an adaptive mirror, the pupil of the objective, be it the illumination objective or the detection objective, is imaged on the adaptive mirror by means of a telescope. The adaptive mirror is deformed in such a way that it corrects and reduces the occurring aberrations. A virtually or entirely aberration-free image can be produced on the camera sensor by means of a further optical lens arranged in the detection beam path.

If the adaptive correction element is realized by a reflective SLM, the pupil of the objective is imaged onto the SLM by means of a telescope. A phase pattern is displayed on the SLM, by the effect of which occurring aberrations are corrected and reduced. Once again, a virtually or entirely aberration-free image can be produced on the camera sensor by means of a further optical lens arranged in the detection beam path.

In a further embodiment, the SLM is combined with a cylindrical lens. By way of example, the cylindrical lens is used in the pupil of the objective in order to carry out the partial correction of the occurring aberrations. The pupil of the objective is imaged onto a reflective SLM by means of a telescope. A phase pattern is displayed on the SLM, by the optical effect of which the remaining residual aberrations are corrected and reduced. A virtually or entirely aberration-free image is produced on the camera sensor by way of a third lens.

The adaptive correction elements can be arranged in the illumination beam path and/or in the detection beam path.

Moreover, the aberrations can also be corrected within the objective.

To this end, for example, an additional pupil is created in the objective, the adaptive correction element being placed at the location thereof in order to correct the occurring aberrations. Here, too, use can be made of a cylindrical lens in order to carry out a partial correction of the aberrations.

The arrangement according to the invention is particularly suitable for an inverted light sheet microscope with an oblique passage of the illumination and detection radiation through a specimen holder, for example in the form of a cover slip or an optically transparent layer such as the base of a Petri dish.

The invention will now be described in connection with the drawings annexed hereto. In particular, FIGS. 1a and 1b were already explained in more detail in the introductory part of the description. The exemplary embodiments are illustrated schematically. Identical technical elements are provided with the same reference signs.

A shared meniscus lens 10 (FIG. 2) and at least one illumination correction element 2KE in the illumination objective 2 and/or at least one detection correction element 3KE in the detection objective 3 are present as essential elements of an arrangement according to the invention for microscopy, in particular for light sheet microscopy, in addition to the illumination objective 2 that is aligned obliquely in relation to the specimen or reference plane 4 and the detection objective 3 that is likewise aligned obliquely in relation to the reference plane 4.

The following exemplary embodiments are illustrated in an exemplary manner on the basis of inverted microscopes 0 and, in further embodiments, may also be embodied as upright microscopes 0.

An exemplary embodiment of an arrangement 1 of an inverted microscope 0 embodied for light sheet microscopy (only illustrated symbolically) with correction elements 2KE, 3KE and a meniscus lens 10 is illustrated in FIG. 2. The angles α1 and α2 between a normal B that is perpendicular to the reference plane 4 and the first optical axis A1 and the second optical axis A2, respectively, are 45° in each case. In each case, two Alvarez plates of an Alvarez manipulator 12 are arranged in the beam path of the illumination radiation BS and in the beam path of the detection radiation DS as adaptive correction elements 2KE, 3KE. The correction elements 2KE, 3KE serve to correct aberrations which may occur on account of the oblique passage of the illumination radiation BS through the base of the specimen holder 7. The meniscus lens 10 assists the transition of the illumination radiation BS from air into an immersion medium 18 and into the medium 8 and the transition of the detection radiation DS from the medium 8 into the immersion medium 18 and into the air.

The specimen holder 7 is held on the specimen stage 11. The specimen stage 11 itself is adjustable in a controlled fashion in an XY-plane, spanned by the X-axis X and the Y-axis Y, by means of drives that are not illustrated in any more detail.

The illumination objective 2 and the detection objective 3 are each adjustable in a controlled fashion along the first optical axis A1 and along the second optical axis A2, respectively, by means of an objective drive 14, which is embodied as a piezo-drive in this case.

The illumination radiation BS is provided by a laser module 15 and shaped by means of a beam-shaping unit 16. The beam-shaping unit 16 is, e.g., an optical unit, by means of which the provided illumination radiation BS is formed, e.g., collimated.

A scanner 17 is present downstream of the beam-shaping unit 16, the shaped illumination radiation BS being deflectable in a controlled fashion in two directions by means of said scanner (XY scanner).

Downstream of the scanner 17, the illumination objective 2 is arranged on the first optical axis A1. The illumination radiation BS that is deflected by the scanner 17 reaches the illumination objective 2 and it is shaped and/or focused by the latter. The light sheet 6 is produced in a specimen region, in which the specimen 5 is situated, by an appropriate deflection of the illumination radiation BS by means of the scanner 17.

The detection radiation DS coming from the specimen 5 and from the specimen region is directed onto a detector 19 along the second optical axis A2 and able to be captured by said detector.

A control unit 13 is present for the purposes of actuating the specimen stage 11, the objective drives 14, the correction elements 2KE, 3KE, the laser module 15, the beam shaping 16, the scanner 17 and/or the detector 19, said control unit being linked to the elements to be actuated in a connection suitable for data transmission (only indicated).

In further embodiments, the control unit 13 is additionally configured to capture, store and/or evaluate measurement values. Further elements and units of the microscope 0 may be actuatable by means of the control unit 13 and/or measurement values can be obtained and evaluated thereby.

For description purposes, two coordinate systems with mutually orthogonal axes are used below. The first coordinate system is the coordinate system of the entire arrangement with an X-axis X, a Y-axis Y and a Z-axis Z. Ideally, the specimen holder 7, in particular the base thereof, is aligned parallel to an XY-plane that is spanned by the X-axis X and the Y-axis Y. The second coordinate system is the coordinate system of the detector 19 with the X-axis X, a y-axis y' and a z-axis z'. Imaging of, for example, an image from the image plane BE onto the detector 19 has the coordinates X and y'. The X-axis X is directed in orthogonal fashion to the plane of the drawing of the figures in both coordinate systems. The two other axes Y and y' and Z and z', respectively, can be superposed on one another by way of a rotation about the X-axis X.

Aberrations that occur during an oblique passage of the illumination radiation BS through the specimen holder 7 are dependent on the thickness thereof. For this reason, the correction elements 2KE, 3KE, for example, are displaceably mounted in the illumination objective 2 and/or the detection objective 3, in order to match an aberration correction to the thickness by displacing the correction elements 12 in relation to one another.

The base of the specimen holder 7 represents a separation layer system with at least one layer made of a predetermined material with a predetermined thickness, separating a medium 8, in which the specimen 5 is situated, from the illumination objective 2 and the detection objective 3. By means of a base that is aligned parallel to the specimen plane 4, the separation layer system is in contact with the immersion medium 18, at least in the region accessible to the illumination objective 2 and the detection objective 3 for illumination and detection purposes, respectively.

In a second exemplary embodiment of the arrangement 1, which is illustrated in FIG. 3 and which corresponds in terms of its basic design to the exemplary embodiment illustrated in FIG. 2, the illumination objective 2 has, once again, an Alvarez manipulator 12 as illumination correction elements 2KE. Optical lenses 20, by means of which the detection radiation DS is steered onto a detection correction element 3KE in the form of an SLM or an adaptive mirror, are present in the beam path of the detection radiation DS. The detection radiation DS that is reflected by the detection correction element 3KE is directed onto a detector 19 and captured by the latter.

In a further embodiment option, the SLM is embodied as a transmissive SLM.

FIG. 4 shows a third exemplary embodiment of the arrangement 1, wherein a cylindrical lens 9, which serves for a partial compensation of occurring astigmatism, is arranged upstream of the optical lenses 20 in the beam path of the detection radiation DS. The detection correction element 3KE is implemented in the form of an SLM or of an adaptive mirror.

A further exemplary embodiment of an arrangement 1 according to the invention is illustrated in FIG. 5. The illumination objective 2 does not have an illumination correction element 2KE. Two detection correction elements 3KE are integrated in the detection objective 3 and configured as reflective SLM(s) and/or as adaptive mirror(s).

An exemplary embodiment of an objective 2, 3 for use in an arrangement 1 according to the invention of a microscope 0 (see FIGS. 2 to 5) is schematically illustrated in FIG. 6.

In addition to the optical lenses 20, which are only shown in an exemplary manner, an actuatable correction element 2KE/3KE embodied as an SLM is arranged in the beam path. The actuation is implemented by means of the control unit 13.

In further embodiments of the arrangement 1 or of the objective 2, 3, provision can be made of sliding lenses that are displaceable relative to the beam path in radial fashion in order to compensate or at least reduce remaining aberrations.

For improved clarity, only one objective 2, 3 is shown in the arrangement 1 illustrated in FIG. 6.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE SIGNS

0 Microscope
1 Arrangement
2 Illumination objective
2KE Illumination correction element
3 Detection objective
3KE Detection correction element
4 Specimen plane (=reference plane)
5 Specimen
6 Light sheet
7 Specimen holder
8 Medium
9 Cylindrical lens
10 Meniscus lens
11 Specimen stage
12 Alvarez manipulator
13 Control unit
14 Objective drive
15 Laser module
16 Beam shaping
17 XY-scanner
18 Immersion medium
19 Detector
20 Optical lens
A1 First optical axis (optical axis of the illumination objective 2)
A2 Second optical axis (optical axis of the detection objective 3)
$\alpha 1$ Angle/illumination angle
$\alpha 2$ Angle/detection angle
B Normal
BE Image plane
BS Illumination radiation
DS Detection radiation

What is claimed is:

1. An arrangement for microscopy, comprising
an illumination optical unit with an illumination objective for illuminating a specimen situated on a specimen carrier in a specimen region of a specimen plane via an illumination beam path, said illumination objective having an optical axis, wherein said optical axis lies in a plane which includes an illumination angle that differs from zero with a plane normal to the specimen plane, in respect of which the specimen carrier is aligned, and illumination is implemented in the plane,
a detection optical unit with a detection objective in a detection beam path, said detection objective having a detection optical axis, the detection optical axis includes a detection angle that differs from zero with the plane normal to the specimen plane,
the illumination objective includes an illumination correction element that is arranged in the illumination beam path or introducible into the illuminating beam path, and/or
the detection objective includes a detection correction element that is arranged in the detection beam path or introducible into the detection beam path,
a meniscus lens being located between the specimen carrier and the illumination and detection objectives, the meniscus lens being arranged both in the illumination beam path and in the detection beam path;
the meniscus lens being configured to correct aberrations that arise on account of a passage through media with different refractive indices of radiation to be detected and/or radiation for illuminating the specimen, and
the illumination correction element and/or the detection correction element being configured to correct remaining aberrations;
wherein a radiation employed for illumination purposes is shaped into a light sheet and directed into the specimen region, and the optical axis of the illumination objective and the light sheet lie in a plane that includes an illumination angle that differs from zero with the plane normal to the specimen plane; and further comprising a separation layer system aligned with and formed by a base of the specimen carrier with at least one layer made of a predetermined material with a predetermined thickness, which separation layer system separates a medium, in which the specimen is situated, from the illumination objective and the detection objective, wherein, by means of a base that is aligned parallel to the specimen plane, the separation layer system is in contact with an immersion medium, at least in a region accessible to the illumination objective and the detection objective for illumination and detection purposes, respectively.

2. The arrangement as claimed in claim 1, wherein the illumination correction element and/or the detection correction element is arranged in a pupil of the illumination objective and/or the detection objective.

3. The arrangement as claimed in claim 1, wherein the illumination correction element and/or the detection correction element is at least one phase plate or a free-form lens.

4. The arrangement as claimed in claim 1, wherein the illumination correction element and/or the detection correction element is a phase plate for correcting static aberrations and an adaptive mirror or a spatial light modulator is present in the illumination beam path and/or in the detection beam path.

5. The arrangement as claimed in claim 1, wherein the illumination correction element and/or the detection correction element are arranged to be adjustable and adaptive correction elements positioned in the illumination and/or the detection beam paths for correcting specimen-induced aberrations.

6. The arrangement as claimed in claim 5, wherein the adjustable and adaptive correction element in the illumination beam path and/or the adjustable and adaptive correction element in the detection beam path is an Alvarez manipulator, a spatial light modulator, at least one adaptive mirror, at least one tilt lens, at least one sliding lens, at least one deformable optical lens or a combination thereof.

7. The arrangement as claimed in claim 5, wherein the adaptive illumination correction element and/or the adaptive detection correction element is a spatial light modulator and a cylindrical lens is present in the detection beam path for partial compensation of occurring astigmatism.

8. The arrangement as claimed in claim 5, wherein the adaptive detection correction element is an adaptive mirror and a cylindrical lens is present in the illumination beam path and/or detection beam path for partial compensation of occurring aberrations.

9. A microscope comprising an arrangement as claimed in claim 1.

* * * * *